US011446831B1

(12) United States Patent
Magdaleno

(10) Patent No.: US 11,446,831 B1
(45) Date of Patent: Sep. 20, 2022

(54) APPARATUS AND METHOD FOR INSPECTING AN UNDERGROUND UTILITY VAULT

(71) Applicant: Utility Design Services, Inc., Temecula, CA (US)

(72) Inventor: Andrew Magdaleno, Temecula, CA (US)

(73) Assignee: UTILITY DESIGN SERVICES, INC., Temecula, CA (US)

( * ) Notice: Subject to any disclaimer, the term of this patent is extended or adjusted under 35 U.S.C. 154(b) by 0 days.

(21) Appl. No.: 17/507,848

(22) Filed: Oct. 22, 2021

(51) Int. Cl.
*B25J 19/02* (2006.01)
*B25J 11/00* (2006.01)
*B25J 5/00* (2006.01)

(52) U.S. Cl.
CPC ............. *B25J 19/022* (2013.01); *B25J 5/007* (2013.01); *B25J 11/008* (2013.01)

(58) Field of Classification Search
CPC ........ B25J 19/022; B25J 5/007; B25J 11/008; E03F 7/12; H04N 7/183; H04N 2005/2255; E21B 47/002
See application file for complete search history.

(56) References Cited

U.S. PATENT DOCUMENTS

| | | | |
|---|---|---|---|
| 4,883,184 A | 11/1989 | Albus | |
| 4,888,488 A * | 12/1989 | Miyake | G11C 7/1051 355/87 |
| 5,956,077 A | 9/1999 | Qureshi | |
| 8,706,340 B2 * | 4/2014 | Zhao | G03B 37/00 901/44 |
| 8,708,183 B2 * | 4/2014 | Burke | B65D 90/00 454/48 |
| 8,773,525 B2 * | 7/2014 | Lortie | E03F 7/12 348/85 |
| 10,822,206 B2 | 11/2020 | Manchester | |
| 11,026,068 B2 * | 6/2021 | Gundel | H04Q 9/00 |

(Continued)

FOREIGN PATENT DOCUMENTS

| | | |
|---|---|---|
| CN | 1071288606 | 10/2019 |
| CN | 212245963 U | 12/2020 |

(Continued)

OTHER PUBLICATIONS

Green et al., Novel Sensors for Underground Robotics, 2012, IEEE, p. 724-728 (Year: 2012).*

(Continued)

*Primary Examiner* — McDieunel Marc
(74) *Attorney, Agent, or Firm* — Klein, O'Neill & Singh, LLP

(57) ABSTRACT

A vault inspection system is configured to obtain visual inspection data of an underground utility vault without disturbing the components within the vault. A support apparatus supports a pole that is used to advance an inspection structure into the vault. A mount frame may be configured to position the support apparatus over an access opening so that the pole will not contact components within the vault. The inspection structure may be a robot that is lowered to the floor of the vault. The inspection structure may be an expandable vision system that may be compacted for advancement through the access opening, and expanded within the vault to provide greater perspective for obtaining inspection data.

11 Claims, 8 Drawing Sheets

(56) References Cited

U.S. PATENT DOCUMENTS

| | | | |
|---|---|---|---|
| 2007/0109404 A1* | 5/2007 | Lortie | H04N 7/183 |
| | | | 348/E7.087 |
| 2012/0271501 A1* | 10/2012 | Zhao | G03B 37/00 |
| | | | 901/44 |
| 2021/0107177 A1* | 4/2021 | Giles | E04B 1/35 |
| 2021/0310962 A1* | 10/2021 | Oetiker | F17C 13/02 |

FOREIGN PATENT DOCUMENTS

| | | |
|---|---|---|
| GB | 1240837 | 7/1971 |
| JP | 2009227419 A | 10/2009 |
| KR | 20200145182 | 12/2020 |
| WO | 2020174042 A1 | 9/2020 |

OTHER PUBLICATIONS

Jiang et al., Autonomous Robotic Monitoring of Underground Cable Systems, 2005, IEEE, p. 673-679 (Year: 2005).*

Green et al., Underground Mining Robot: a CSIR Project, 2012, IEEE, p. 1-6 (Year: 2012).*

* cited by examiner

APPARATUS AND METHOD FOR INSPECTING AN UNDERGROUND UTILITY VAULT

CROSS-REFERENCE TO RELATED APPLICATIONS

Not Applicable.

BACKGROUND

The present disclosure is related to methods and systems for inspecting an underground vault.

Underground utility vaults house utility equipment such as electricity distribution, gas, communications, cable and data equipment. Underground electrical vaults, in particular, are commonly used in power distribution systems. They may contain switchgear, transformers, fuses, cables, and circuit breakers. Underground vaults are subject to a variety of adverse environmental factors, including flooding, pests, and toxic or explosive gases. Problems in vaults that are not addressed may lead to failures that pose severe safety hazards and can be expensive to repair. Also, some aging vaults may lack adequate documentation so that it is uncertain what components are within the vault as well as the condition of those components. Inspecting vaults enables determination and documentation of the contents and condition of components therewithin. Such documentation can be valuable in detecting and remedying dangerous and unsafe conditions.

However, accessing such vaults to perform inspections can be difficult and hazardous. High voltage components, energized surfaces, high temperatures, and even the possibility of toxic gasses can make it both difficult and dangerous for workers to enter the vaults to perform inspections. Also, some vaults aren't configured for easy human access.

Remote inspection of utility vaults can be performed using camera-equipped tools advanced into the vault to create a photographic record of the vault's contents and condition. However, the positioning and size of components within the vault often is unknown. Remotely moving monitoring tools within the vault runs the risk of bumping into such vault componentry, which often is quite old and sometimes fragile. Bumping into vault componentry can cause damage to such componentry that must be repaired. In the event of such damage, a relatively low-cost inspection job can lead to a high-cost repair, possible service interruptions, or even destructive events such as fires or explosions.

BRIEF SUMMARY

The present disclosure describes apparatus and methods for remotely inspecting underground utility vaults. The apparatus can be configured to deploy a camera-equipped robot to the floor of the vault in a manner that securely lowers the robot into place, and also retrieves the robot, while negotiating around vault equipment. Other embodiments can advance a collapsed or compacted camera system through a tight manhole access, and once inside the vault the camera system can expand so as to provide an improved visual inspection of the vault.

In accordance with one embodiment, the present specification provides a method of inspecting an underground utility vault. The method includes arranging a frame to be supported by the ground and disposed vertically above a vault access opening. The frame comprises a support apparatus that is moveable in an x and y direction within a plane and in a first rotational direction and a second rotational direction transverse to the first rotational direction. The support apparatus is configured to be lockable in a selected position, the selected position including an x-position, a y-position and a rotational position. The support apparatus is configured to hold a pole having an inspection structure attached thereto. The method includes advancing a vision system mounted to the pole vertically through the vault access opening and into the vault while the pole is held by the support apparatus so that the pole extends along a support apparatus angle relative to a vertical direction, and actuating the vision system of the inspection structure to obtain a visual inspection data.

In some versions, the vision system is configured to be movable from a compacted configuration having a first diameter and an expanded configuration having a second diameter, the second diameter being greater than the first diameter.

Additional versions further comprise the step of providing first and second arms that may be retracted when in the compacted configuration and extended when in the extended position, the first and second arms are of equal weight so that the first and second arms are balanced and horizontal when traversed to the extended configuration.

Yet additional version comprise keeping the vision system in the compacted configuration while it is advanced through the access opening, and moving the vision system to the expanded configuration prior to actuating the vision system step.

Some versions comprise rotating the vision system about a central vertical rotating axis when obtaining the visual inspection data.

In some such versions the vision system is configured to remain in a horizontal attitude when in the expanded configuration even if the pole is at an angle relative to a vertical direction.

Further versions can comprise obtaining visual inspection data when the vision system is at a first position at a first height within the vault, moving the vision system to a second position at a second height within the vault, and obtaining additional visual inspection data at the second position.

Yet further versions can comprise detecting whether another structure is within a threshold proximity of the vision system when moving the vision system from the compacted configuration toward the expanded configuration, and stopping movement of the vision system toward the expanded configuration when another structure is detected to be within the threshold proximity.

Still further versions can comprise detecting whether the vision system is contacting another structure when moving the vision system from the compacted configuration toward the expanded configuration.

In some instances a vault component within the vault is at least partially aligned with the access opening, and the selected position is positioned above the access opening so as to not be aligned with the vault component.

Yet additional versions can additionally comprise saving the visual inspection data and data concerning the position of the support apparatus and pole in a computer system.

Some such versions can additionally comprise selecting an x and y position and support apparatus angle based on data saved on the computer system from a previous visual inspection.

In another embodiment, the present specification proves an underground vault inspection system, a mount frame of the system is configured to be placed on a surface so as to extend over an access opening of an underground vault. A support apparatus is configured to be supported by the mount frame, the support apparatus configured to be moved and secured at any of a plurality of x- and y-positions above the access opening. A rigid pole having a distal end can be provided. An inspection structure can be attached to the distal end of the pole, the pole supported by the support apparatus. The pole and support apparatus can be configured so that the pole can be advanced through the access opening and into the vault in a location determined by the x- and y-position of the support apparatus.

In some such embodiments, the inspection structure can comprise an expandable vision system that is configured to be movable between a compacted configuration having a compacted diameter and an expanded configuration having an expanded diameter that is greater than the compacted diameter. The vision system can comprise a machine vision unit adapted to be a greater distance from the pole when the vision system is in the expanded configuration that when the vision system is in the compacted configuration. In some such embodiments, the machine vision unit can comprise a LIDAR unit.

In some versions the vision system comprises a first expandable linkage and a second expandable linkage disposed 180 degrees from one another and configured to be balanced relative to one another when in the expanded configuration.

In additional versions the vision system is balanced about a vision system connecting point, and the vision system is connected to a distal end of the pole so that the vision system remains balanced and in a horizontal attitude even if the pole is at an angle relative to a vertical direction.

In yet additional versions the vision system is rotatable relative to the pole, and the vision system is adapted to remain in the horizontal attitude during such rotation.

In further versions a first LIDAR unit is supported by the first linkage, and a second LIDAR unit is supported by the second linkage.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3:
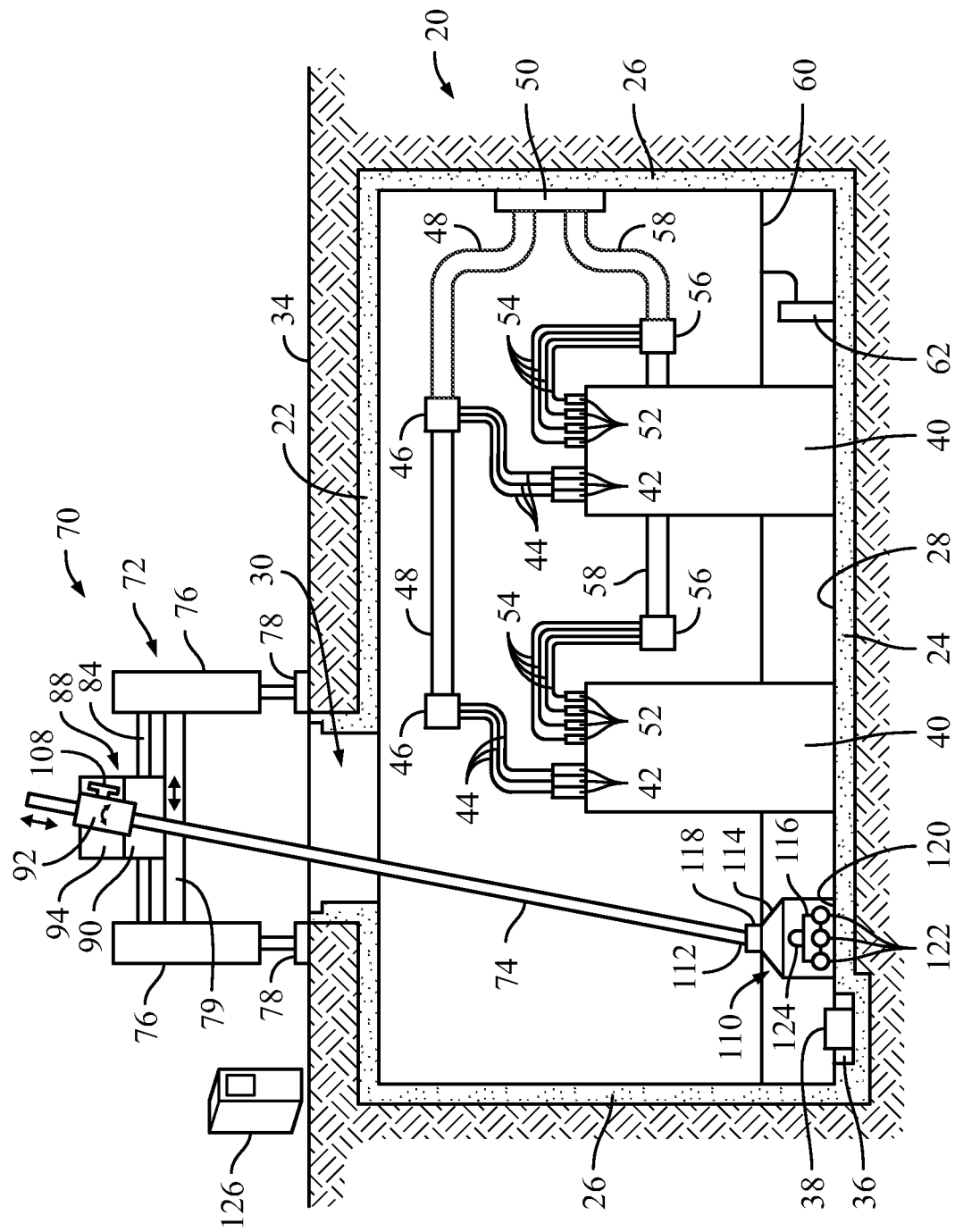
FIG. 3 shows a schematic view of an embodiment of a vault inspection system being used with the vault of FIG. 1.

As will be discussed in more detail below, the present specification discusses a vault inspection system configured to obtain visual inspection data of a vault 20 using an inspection structure 110 (such as the remote control rover 116 in FIG. 3 or expandable vision system 130 in FIG. 8) supported on a pole 74 that is advanced into the vault 20. Referring now to FIG. 3, a mount frame 72 is configured to sit above a vault's access opening 30 and support a support apparatus 88 that in turn holds the pole 74. Since portions of electrical components in a vault may be directly below (i.e., aligned vertically with) the access opening 30 (see FIG. 4), the mount frame 72 is configured so that the support apparatus 88 can be moved in an x-direction (see arrow 89 in FIG. 4) and a y-direction (see arrow 87 in FIG. 4) and secured at a location above the access opening 30 that is not directly above (i.e., aligned vertically with) such electrical components. Thus, the pole 74 and associated inspection structure 110 can be supported by the support apparatus 88 and advanced into the vault 20 in a manner that avoids contacting such electrical components. The support apparatus 88 can angle a pole support 92 so that the pole 74 is directed into the vault 20 at an angle to even further space the inspection structure 110 from electrical components in the vault. The pole support 92 may be rotated in two directions whose rotational axes are 90 degrees from each other, as shown by rotational arrow 93 and rotational arrow 95.

In some embodiments the inspection structure 110 can be a robot 116 that is lowered to the floor 28 of the vault 20 in a basket 114. In other embodiments the inspection structure 110 can be an expandable vision system 130 that can move between a compacted configuration and an expanded configuration. In the compacted configuration a reduced diameter of the vision system 130 makes it is easier to advance the vision system 130 through the access opening 30 and into the vault 20 at a desired x- and y-position and angle. Once in the vault 20 the vision system 130 can be expanded so as to enable more complete perspective for data inspection. Preferably the vision system 130 will remain level even if the pole 74 is disposed at an angle relative to vertical. The vision system 130 can have two expandable assemblies that each include a vision unit such as a LIDAR unit 144. The vision system 130 can be configured to rotate about 180 degrees when expanded so as to enable the LIDAR units to obtain more thorough inspection data (visual data). Such inspection data can be saved to a computer system 126, along with position data, and used to further maneuver the vision system 130 within the vault 20 while avoiding obstacles.

Figure 1:
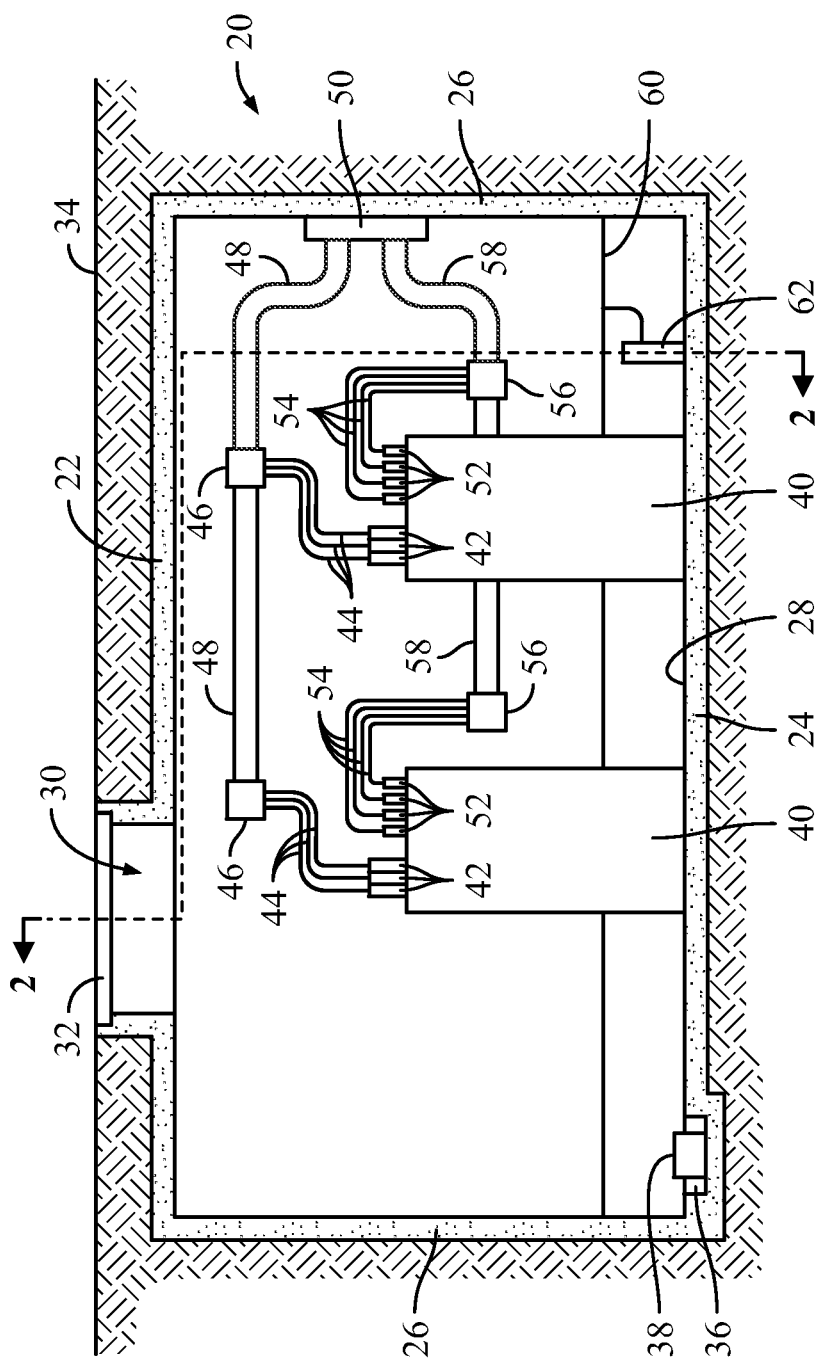
FIG. 1 shows a schematic view of an example underground electrical vault.
Figure 2:
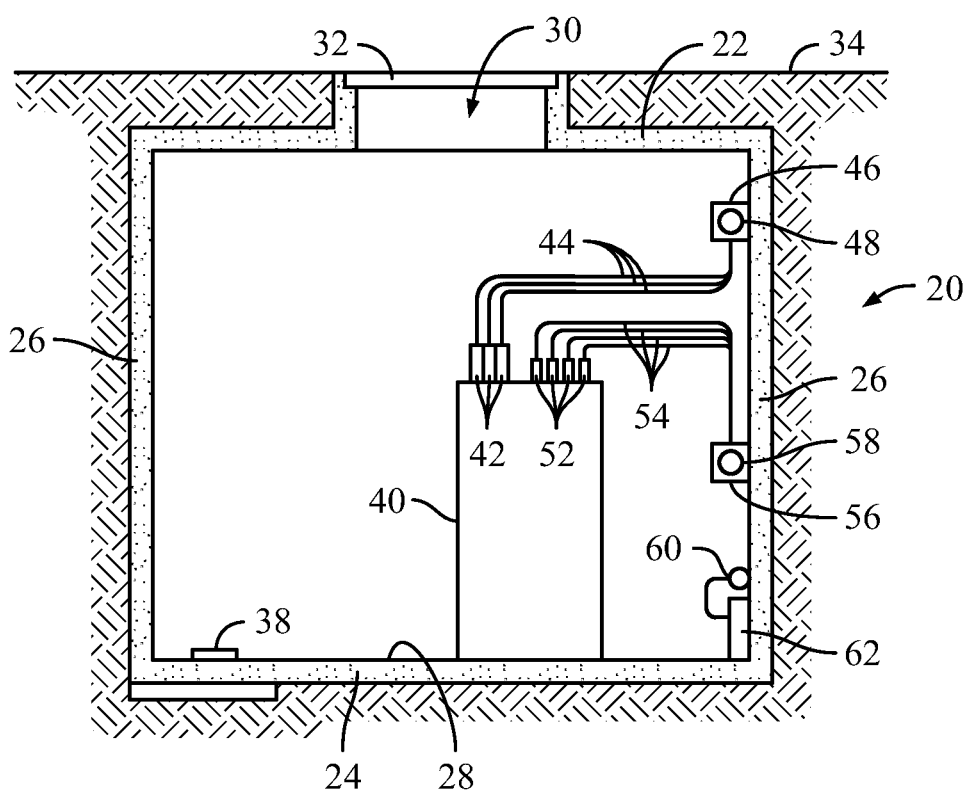
FIG. 2 shows a cross-section of the underground vault of FIG. 2 taken along line 2-2.

With initial reference to FIGS. 1 and 2, an exemplary underground utility vault 20 is depicted schematically. The vault 20 defines an interior enclosed by a top wall 22, bottom wall 24 and side walls 26. A floor 28 is defined as the top surface of the bottom wall 24. An access opening 30 can be formed through the top wall 22 so as to provide access to the interior of the vault 20. A cover 32 can selectively close the access opening 30. In some instances the access opening 30 is sized to enable a human to enter the vault 20. However, some vaults 20 may have larger or smaller access openings 30. The illustrated utility vault 20 is installed underground, preferably so that the cover 32 is generally aligned with a ground surface 34. Underground utility vaults 20 can be subject to flooding. As such, the illustrated vault 20 includes a sump 36 for collecting fluid and a sump pump 38 disposed in the sump 36 so as to pump fluids out of the vault 20.

Continuing with reference to FIGS. 1 and 2, the example utility vault 20 is an electrical vault configured to hold electrical utility components such as transformers 40, which can be supported on the floor 28 of the vault 20. Each of the transformers 40 can have a plurality of high voltage bushings 42 that each attach to a high voltage cable 44. Such cables 44 can extend from the transformers 40 to cable holders 46, which can be attached to one of the side walls 26 or, in some instances, to the top wall 22. Such cables 44 can then be included in conduit 48 or a cable race that extends to an input/output structure 50 that may include apertures through the side wall 26 for directing the high voltage cables 44 out of the vault 20. Similarly, each of the transformers 40 can have a plurality of low voltage bushing 52 that each attach to a low voltage cable 54, which cables extend to cable holders 56. Such low voltage cables 54 can then be included in conduit 58 that extends to the input/output structure 50 for directing the low voltage cables 54 out of the vault 20. As shown, the vault 20 can include a ground wire 60 extending along the side walls 26 and connected to a ground rod 62. It is to be understood that other electrical vaults 20 can be configured differently and can include more, less, and/or different electrical components such as switchgear, electrical boxes, and the like.

Figure 4:
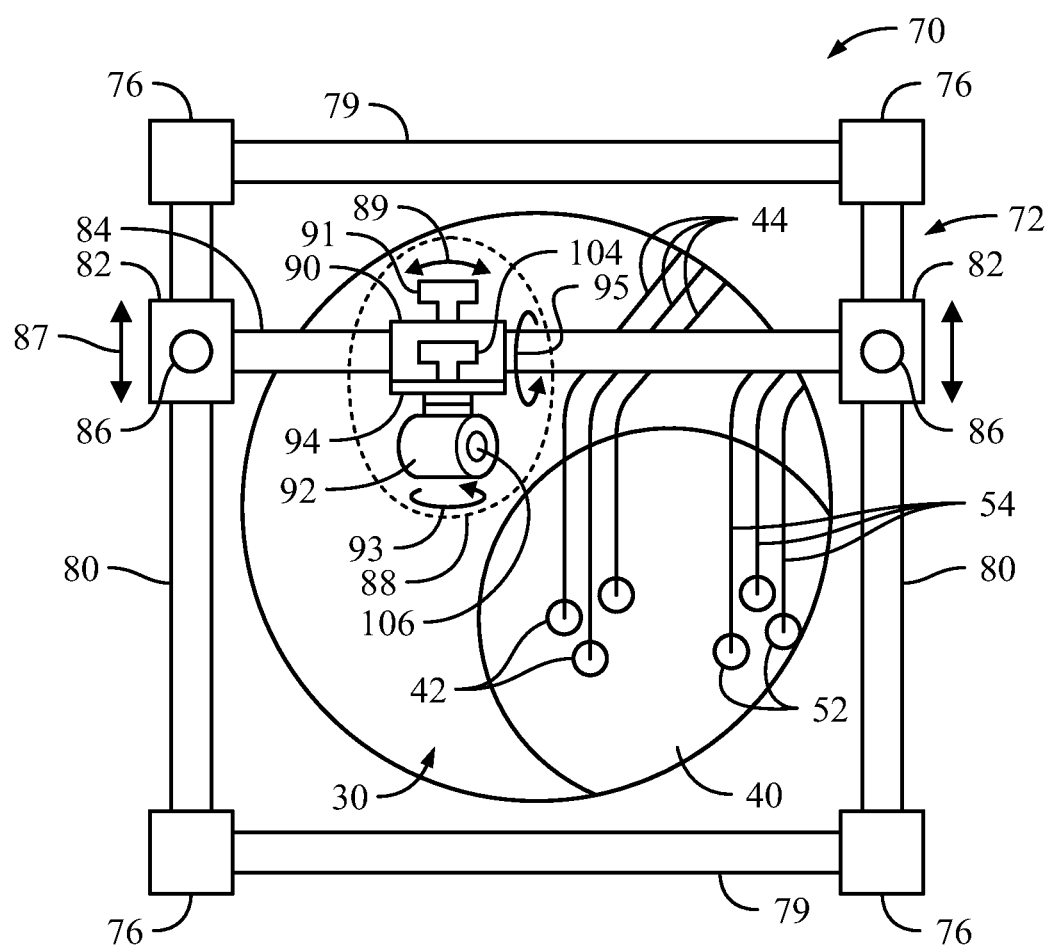
FIG. 4 is a top view of the vault inspection system of FIG. 3.

With reference next to FIGS. 3 and 4, a vault inspection system 70 is configured to remotely inspect an underground utility vault 20 without disturbing (i.e., without contacting or interfering with) the components within the vault 20. The illustrated vault inspection system 70 includes a mount frame 72 that is configured to support a pole 74 that can be advanced (i.e., lowered) into the vault 20 to deliver inspection equipment 110, 130. The mount frame 72 can include a plurality of legs 76 (three or more but as shown four legs) having feet 78 that support the corresponding leg 76 and engage the ground surface 34, preferably spaced about the vault access opening 30. The feet 78 can be telescopingly adjusted to the legs 76 to level of the mount frame 72. The legs 76 can be connected to one another via a pair of first cross members 79 and a pair of second cross members 80.

With continued reference to FIGS. 3 and 4, the second cross members 80 can be configured to slidably support track supports 82. A support track 84 can extend between the track supports 82. As such, the support track 84 can move linearly in a y-direction via the track supports 82 moving over the second cross members 80. The track supports 82 can be configured to be lockable relative to the second cross members 80 so that they will be blocked from moving relative to the second cross members 80. For example, each track support 82 can comprise a knob 86 which, when tightened, increases friction so as to secure the position of the corresponding track support 82 relative to the second cross member 80. A support apparatus 88 can be slidably supported on the support track 84 so that the support apparatus 88 can move linearly over the support track 84. The support apparatus 88 can include a sliding body 90 that slides in an x-direction over the support track 84, a mount plate 94 extending from the sliding body 90, and a pole support 92 configured to hold the pole 74. The sliding body 90 also can be configured to be lockable relative to the support track 84. For example, the sliding body 90 can comprise a knob 91 (see FIG. 4) which, when tightened, secures the position of the sliding body 90 (and support apparatus 88) relative to the support track 84. Notably, the track support 82 can slide in the direction of arrow 87 and be locked into position by knob 86; the support apparatus 88 can slide in the direction of arrow 89 (see FIG. 4) and be locked into position by knob 91. In this manner, the structure of the mount frame 72 enables precise positioning of the support apparatus 88 in an x-y plane.

Figure 5A:
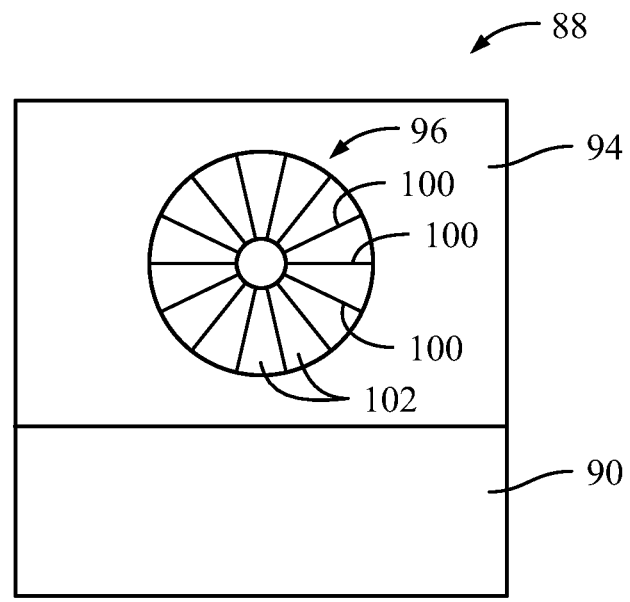
FIG. 5A is a schematic side view of a support apparatus used with the vault inspection system.
Figure 5B:
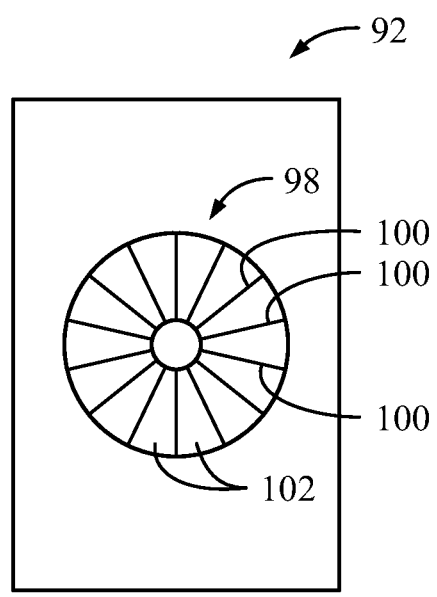
FIG. 5B is a schematic side view of a pole support configured to fit with the support apparatus of FIG. 5A.

Continuing with reference to FIGS. 3 and 4, and with additional reference to FIGS. 5A and 5B, the support apparatus 88 can be configured to support a pole support 92. As noted above, the illustrated support apparatus 88 includes the mount plate 94 extending from the sliding body 90. The mount plate 94 incudes a mount interface 96 (see FIG. 5A), and the pole support 92 includes a complementary pole support interface 98 (see FIG. 5B). The illustrated interfaces 96, 98 can each comprise a series of complementary-shaped ridges 100 and slots 102 so that the interfaces 96, 98 can complementarily fit with one another over a wide range of rotational angles. When the desired rotational angle is set, a knob 104 (see FIG. 4) can be tightened to hold the interfaces 96, 98 in a tight fit together so that the pole support interface 98 (and associated pole support 92) will not rotate relative to the mount interface 96 (and associated mount plate 94). As such, the pole support 92 can be held at a plurality of angles relative to the support apparatus 88. Further, the pole support 92 includes an aperture 106 (see FIG. 4) configured to slidably receive the pole 74 (see FIG. 3) therewithin. A knob 108 (see FIG. 3) can be provided and configured so that, when the knob 108 is tightened, the pole 74 can be frictionally engaged and prevented from further sliding relative to the pole support 82. In some variations, the support apparatus 88 can be rotatable in a plane transverse to the plane in which the pole support 92 rotates as shown by rotational arrow 95 (see FIG. 4). The support apparatus 88 can be rotated by loosening knob 91, rotating the support apparatus 88, then tightening the knob 91. As such, the pole support 82 can be secured in any rotational direction.

The structure discussed above thus enables the pole 74 to be supported securely at a desired x and y position above the access opening 30 of an underground vault 20 and to be advanced through the access opening 30 into the underground vault 20 at a desired angle in both the x and y direction that is selected to ensure that the pole 74 (and the inspection device 110 carried by the pole 74, such as the robot 116 or vision system 130) does not come into contact with any components within the vault 20. It is to be understood that the specific structure discussed above shows one embodiment, and variations of the structure can be made while fulfilling the basic operating principles. For example, in one variation, one or more motors can be provided to control all movements discussed herein including but not limited to movement in the x and y directions, rotation of the pole support 92, rotation of the support apparatus 88 and advancement of the pole 74 into the vault 20. In additional variations, the pole 74 can have a telescoping structure. In further variations the mount frame 72 can be made up of three legs 76 arranged in a tripod configuration, but preferably still enabling x and y positioning of the support apparatus 88 above an access opening 30.

With reference again to FIG. 3, an inspection structure 110 can be attached to a distal end 112 of the pole 74. In FIG. 3, the illustrated inspection structure 110 is a basket 114 configured to hold a robot 116 that is adapted to remotely inspect the vault 20. The basket 114 is attached to the distal end 112 of the pole 74 via a joint 118. Preferably, the joint 118 is configured to support the basket 114 in a manner so that the basket 114 is maintained in a generally horizontal attitude even when the pole 74 is angled relative to vertical. This can be achieved via a variety of specific structures. For example, the basket 114 may be configured to hang from the joint 118 via a wire or the like so that its attitude is unaffected by the angle of the pole 74, or the joint 118 may comprise a U-joint or gimbal arrangement configured to ensure the basket 114 is held in the horizontal attitude.

The illustrated basket 114 comprises a bottom wall 120 that is configured to support the robot 116. The illustrated robot 116 comprises wheels 122, and is configured to be deployed from the basket 114 when the basket bottom wall 120 rests upon the floor 28 of the vault 20. The robot 116 can be remotely controlled so as to move about the floor 28 of the vault 20. Preferably, the robot 116 includes a vision system 124 that comprises one or more of a digital camera, LIDAR, proximity sensors or other imaging and navigation structures so that it can move about the vault 20 without contacting and damaging components while obtaining a visual record of the contents of the vault. The robot 116 can be configured to be remotely controlled by a worker outside of the vault 20 or be autonomously controlled when within the vault 20. The robot 116 preferably includes computing structures and memory, as well as a wired or wireless communication apparatus. As such, data acquired by the vision system can be saved in memory and/or transmitted to a computer system 126 outside of the vault 20.

With specific reference to FIGS. 3 and 4, in order to perform an inspection of a vault 20, a worker will remove the cover 32 and perform a visual inspection through the access opening 30. As depicted, some of the electrical components in the vault 20 may generally be aligned with the access opening 30. It is desired to avoid contacting such components. Thus, the worker will set up the mount frame 72 and make x-y directional positioning so that the support apparatus 88 is aligned with a space clear of the electrical components within the vault 20. In the example of FIG. 4, the support apparatus 88 has been arranged to as to be spaced from the transformer 40 and cables 44 within the vault 20. As also shown in FIG. 3, in this example the pole support 92 has been angled relative to vertical so as to even further space the pole 74 and associated inspection structure 110 from the electrical components within the vault 20. Once the support apparatus 88 has been arranged to avoid such electrical components, the pole 74 and inspection structure 110 (here the basket 114) can be advanced downwardly through the access opening 30 into the vault 20, spaced to avoid vault components as it is advanced. Eventually, the basket 114 reaches the floor 28 of the vault 20. The robot 116 can then be deployed to maneuver about the vault 20, using its vision system 124 at a plurality of positions to inspect and document the vault 20.

Figure 6:
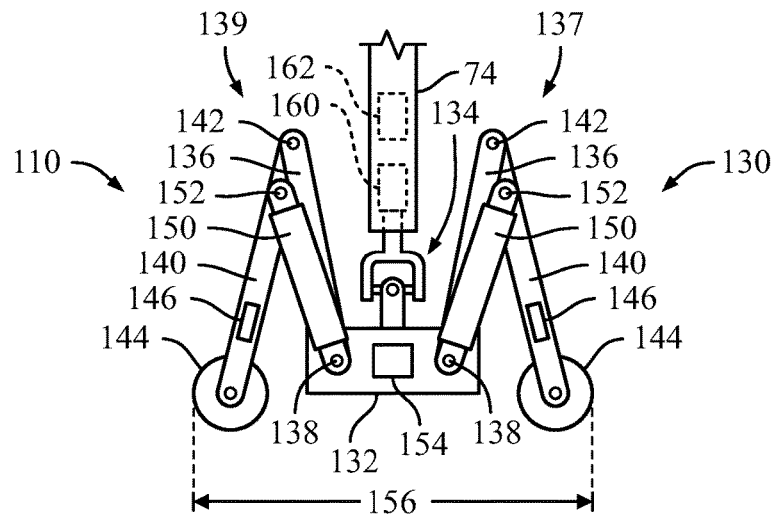
FIG. 6 is a schematic side view of an embodiment of an expandable vision system attached to a pole, with the expandable vision system depicted in a compacted configuration.
Figure 7:
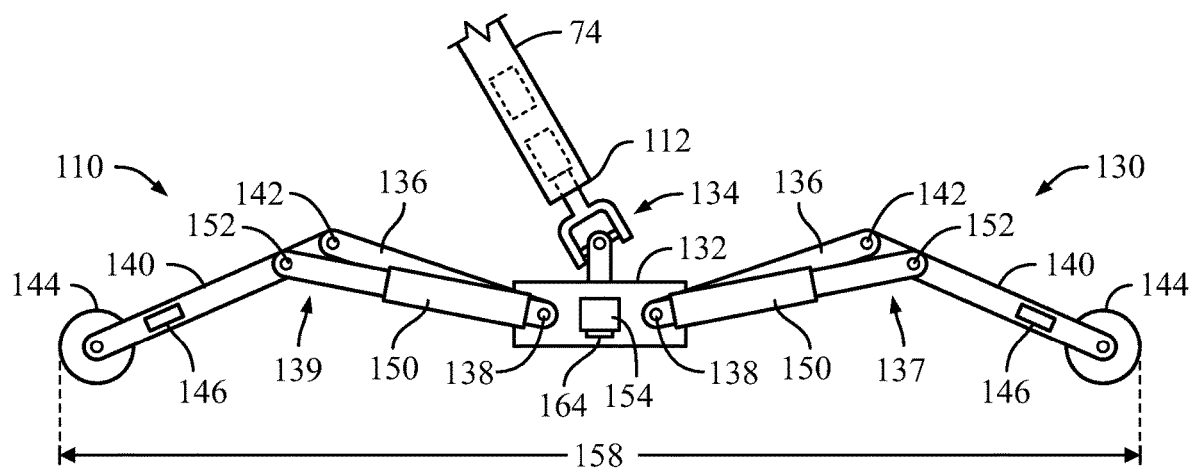
FIG. 7 shows the expandable vision system of FIG. 6 is an expanded configuration.

With reference next to FIGS. 6 and 7, another embodiment of an inspection structure 110 for attachment to the distal end 112 of the pole 74 comprises an expandable vision system 130. The illustrated expandable vision system 130 is configured to be movable between the compacted configuration shown in FIG. 6 and the expanded configuration in FIG. 7. In the illustrated embodiment, the expandable vision system 130 includes a base structure 132 (see FIG. 6) that is connected to the distal end 112 of the pole 74 via a U-joint 134, gimbal, or the like. The U-joint 134 attaches at a central attachment point that is at a vertical center of gravity of the base structure 132. As such, no matter the angle of the pole 74, the base structure 132 can be level, or horizontal.

Continuing with reference to FIGS. 6 and 7, a first expandable linkage 137 and a second expandable linkage 139 are provided. Each linkage 137, 139 comprises a first arm 136 that may be rotatably connected to the base structure 132 at a joint 138 disposed on opposing sides of the base structure 132. A second arm 140 is rotatably connected to each first arm 136 at a hinge 142. A machine vision structure, such as a LIDAR unit 144, may be disposed at the distal end of each second arm 140. Optionally, a proximity sensor 146 can also be disposed at or near the distal end of each second arm 140 so that as the arms are traversed to the expanded configuration, the arms can be stopped if the proximity sensors senses an object that will be hit if the arms continue to be traversed toward the expanded configuration. In the illustrated embodiment, an expandable piston 150 extends from each joint 138 to a control joint 152 on the associated second arm 140. A motor 154 configured to operate the pistons 150 can be supported on the base structure 132. As such, the expandable vision system 130 can be selectively operated between the compacted configuration depicted in FIG. 6, in which it has a compacted diameter 156, and the expanded configuration depicted in FIG. 7, in which it has an expanded diameter 158.

As depicted in FIG. 7, the expandable vision system 130, being attached to the pole 74 via the U-joint 134, can remain substantially horizontal, or level, regardless of the angle of the pole 74. Preferably, the expandable linkages 137, 139 structures (i.e., arms 136, 140 and LIDAR units 144) are disposed on opposing sides of the base structure 132 (i.e., about 180 degrees from one another), are weighted substantially the same, and expand/retract at substantially the same rate so that the expandable vision system 130 is balanced during operation and during expansion and contraction. As such, the vision system 130 stays level during operation.

Figure 8:
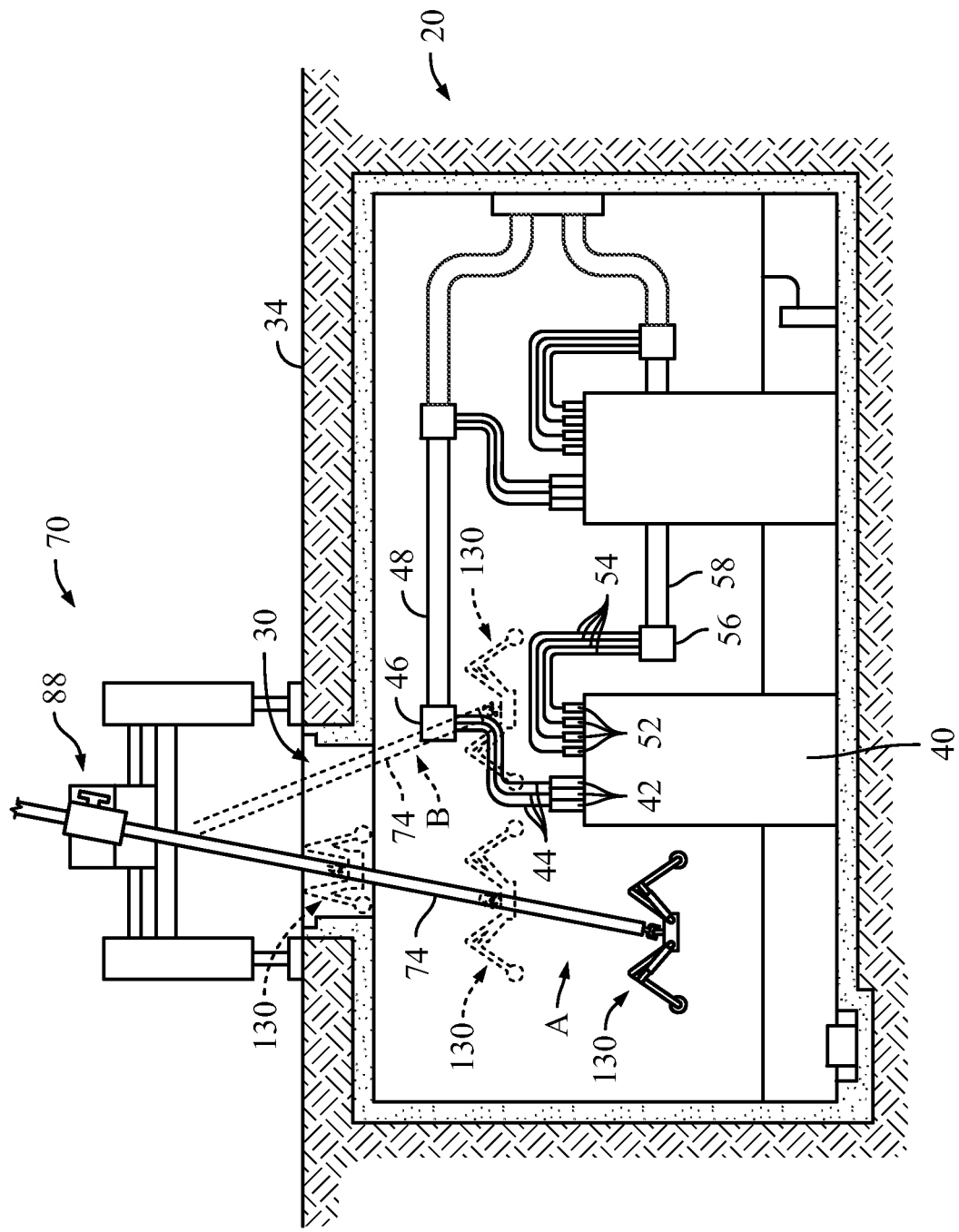
FIG. 8 shows the expandable vision system of FIGS. 6-7 being used with the vault of FIG. 1.

With additional reference to FIG. 8, in operation, the expandable vision system 130 can be held in the compacted position, and advanced through the access opening 30 and into the vault 20. In the compacted configuration, the vision system 130 is able to fit through small access openings 30. The compacted configuration can also be helpful with larger access openings 30, as it enables the vision system 130 to be advanced through access openings 30 from a position near a side wall of the opening and/or at an angle from vertical. Once inside the vault 20, the expandable vision system 130 can be expanded to its expanded position. In some variations the vision system 130 is retained in its compacted configuration until it is advanced to a desired position, at which time it is expanded, and its vision units 144 are used to obtain inspection data. Also, once data is obtained, the vision system 130 can be advanced to another position in order to obtain more inspection data. Such advancement may include contracting the vision system 130 to the compacted configuration, repositioning the vision system 130 then rotating and moving the support apparatus 88, moving the support pole 74 and expanding the vision system 130 to gather more information in the vault. Alternatively, the vision system can remain in the expanded configuration and be moved and rotated as desired so long as the sensors don't detect that the vision system will contact any components within the vault. Moreover, it is contemplated that the initial vision sensing of the components in the vault may be used to assist in progressive inspection of the vault by using the previously obtained data to maneuver the vision system 130 in the vault without disturbing its content. In some modes of operation, the vision system 130 can be compacted and removed from the vault 20 after obtaining inspection data at a first position, and then reintroduced to the vault and advanced to a second position, to be expanded and obtain inspection data. The location of the second position can be based at least partially on data obtained at the first position. In additional modes of operation, the vision system 130 is advanced to a second position to obtain inspection data without retracting it from the vault 20.

With reference again to FIG. 6, a pole motor 160 can be provided and attached to the U-joint 134 so as to provide rotational movement of the vision system 130 relative to the pole 74. As such, the LIDAR units 144 can be moved during data acquisition, enabling the vision system 130 to obtain data from a plurality of perspectives even when the vision system 130 is maintained at a fixed position in the vault 20. The illustrated embodiment includes two opposing sets of arms 136, 140 and LIDARs 144, and as such preferably the motor 160 rotates the vision system 130 about 180 degrees so that a full 360 degree image of the vault 20 can be obtained. Also, in some embodiments the LIDAR units 144 are configured to obtain a broad vertical range of data. In additional variations, the LIDAR units can be rotationally mounted and motor-controlled in order to facilitate obtaining a broad vertical range of image data.

A computing device 162, comprising one or more of a processor, data memory module and transceiver can be provided to control operation of the motors 154, 160, LIDAR units 144 or the like, and to collect and save inspection data obtained by the vision system 130 and/or to transmit such data to an external computing system 126 (see FIG. 3).

In variations in which a proximity sensor 146 is fitted, the proximity of the vision system 130 relative to components of the vault 20 will be detected during expansion of the vision system 130. If the proximity sensor 146 detects a structure in the path of the expanding arms 136, 140, a signal can be sent to the computing device 162, which will act to stop expansion of the vision system 130 so that contact is not made with vault components. Some variations can have a load sensor 164 fitted to motor 154, which load sensor 164 can be configured to detect, based on motor load, if any part of the vision system 130 has come into contact with a vault component. If such contact is detected, the load sensor 164 can signal the motor 154 and/or computing device 162 so that the motor 154 is controlled to stop expansion and, in some variations, automatically retract at least a short distance. In some variations, the vision system 130 can obtain inspection data when partially expanded, or in other words in a position between the compacted configuration and the fully expanded configuration.

It is to be understood that many types of data can be obtained and saved when performing inspections. In addition to the visual data obtained by cameras and the like, positioning data concerning the depth of the vision system 130, or the depth the pole 74 has been advanced into the vault 20, the angular positioning of the pole, the x- and y-positions of the support apparatus 88, and the like, can be recorded and saved by the computer system 126. Such data can be saved and compared with previous inspection data. Also, previously saved inspection data can be used to inform future inspections. For example, the system can be configured to automatically set up and operate a vault inspection system 70 using the same inspection parameters as were previously used so as to more easily detect any changes.

Figure 9:
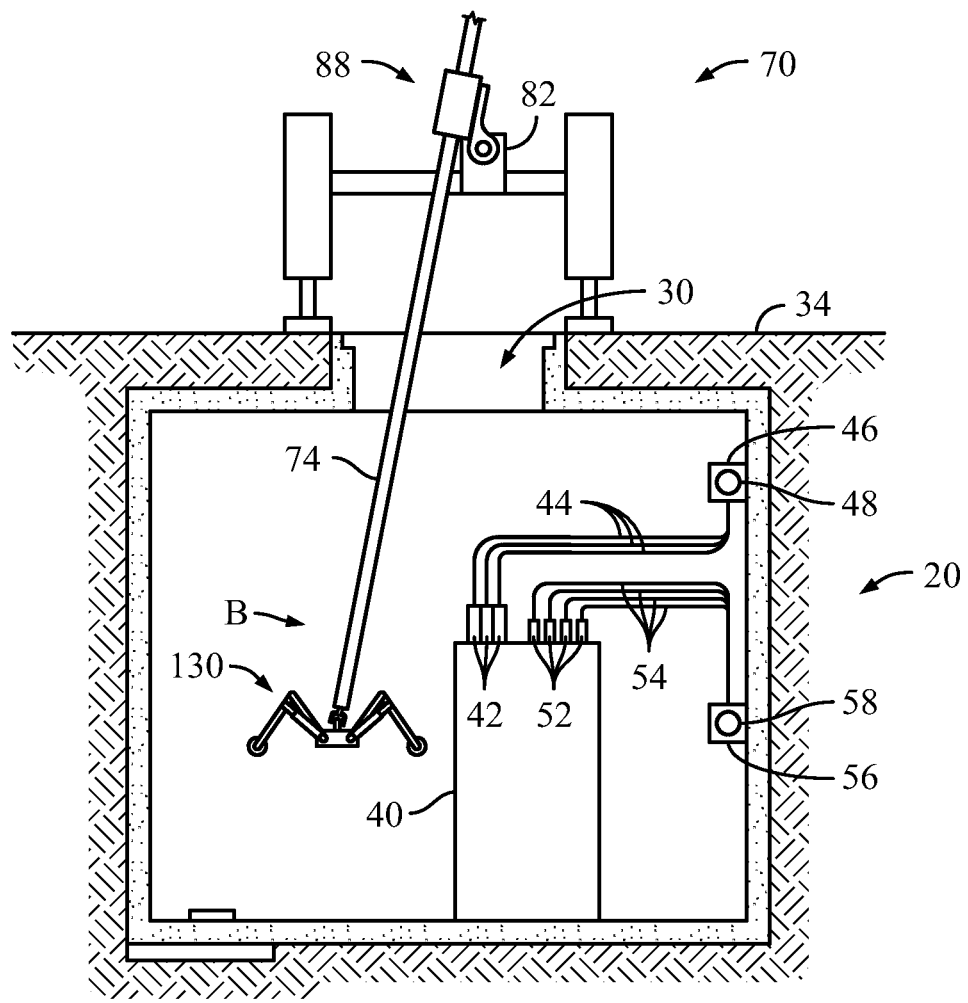
FIG. 9 shows another view of the expandable vision system of FIG. 6-7 being used with the vault of FIG. 1.

Additionally, inspection data can be obtained using multiple angular approaches and vision system positions. For example, with reference again to FIG. 8, after receiving initial inspection data from a first angular and position approach (A), the vault inspection system 70 may determine that another perspective is available and/or necessary. As such, the system may compact the expandable vision system 130, fully or partially withdraw the vision system 130, readjust the angular position of the support apparatus 88, and again advance the vision system 130 into the vault 20 to a much different position (B) (see FIGS. 8 and 9). The vision system 130 can then be partially or fully expanded, and additional inspection data can be obtained and saved to the computer system 126. When it is determined that sufficient inspection data has been obtained, or that no additional inspection data can be obtained without undue risk of contacting vault components, the vision system 130 can be compacted and fully withdrawn from the vault 20.

The embodiment(s) discussed above have included specific structural features. However, it is contemplated that variations may employ somewhat different structures while applying inventive features. For example, one variation can include three or more arm 136, 140/LIDAR 144 combinations. Also, expandable structures for supporting the LIDAR units 144 can comprise telescoping poles, linkages, and actuators configured in other manners. Further, in addition or instead of the LIDAR units 144, variations can include visible-light-based cameras, RADAR, infrared and/or other machine vision technologies.

The above description is given by way of example, and not limitation. Given the above disclosure, one skilled in the art could devise variations that are within the scope and spirit of the invention disclosed herein, including various ways of specifically configuring the expandable vision system and/or various technologies for obtaining and analyzing visualization data. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of inspecting an underground utility vault, comprising:
   arranging a frame to be supported by a ground and disposed vertically above a vault access opening, the frame comprising a support apparatus that is moveable in an x and y direction within a plane and in a first rotational direction and a second rotational direction transverse to the first rotational direction, the support apparatus configured to be lockable in a selected position, the selected position including an x-position, a y-position and a rotational position, the support apparatus configured to hold a pole having an inspection structure attached thereto;
   advancing a vision system mounted to the pole vertically through the vault access opening and into the vault while the pole is held by the support apparatus so that the pole extends along a support apparatus angle relative to a vertical direction; and
   actuating the vision system of the inspection structure to obtain a visual inspection data;
   wherein a vault component within the vault is at least partially aligned with the access opening, and the selected position is positioned above the access opening so as to not be aligned with the vault component.

2. The method of claim 1, wherein the vision system is configured to be movable from a compacted configuration having a first diameter and an expanded configuration having a second diameter, the second diameter being greater than the first diameter.

3. The method of claim 2 further comprising the step of providing first and second arms that may be retracted when in the compacted configuration and extended when in the extended position, the first and second arms being of equal weight so that the first and second arms are balanced and horizontal when traversed to the extended configuration.

4. The method of claim 1, comprising keeping the vision system in the compacted configuration while it is advanced through the access opening, and moving the vision system to the expanded configuration prior to actuating the vision system step.

5. The method of claim 1, comprising rotating the vision system about a central vertical rotating axis when obtaining the visual inspection data.

6. The method of claim 1, wherein the vision system is configured to remain in a horizontal attitude when in the expanded configuration even if the pole is at an angle relative to vertical.

7. The method of claim 1, comprising obtaining visual inspection data when the vision system is at a first position at a first height within the vault, moving the vision system to a second position at a second height within the vault, and obtaining additional visual inspection data at the second position.

8. The method of claim 1, comprising detecting whether another structure is within a threshold proximity of the vision system when moving the vision system from the compacted configuration toward the expanded configuration, and stopping movement of the vision system toward the expanded configuration when another structure is detected to be within the threshold proximity.

9. The method of claim 1, comprising detecting whether the vision system is contacting another structure when moving the vision system from the compacted configuration toward the expanded configuration.

10. The method of claim 1, additionally comprising saving the visual inspection data and data concerning the position of the support apparatus and pole in a computer system.

11. The method of claim 1, additionally comprising selecting an x and y position and support apparatus angle based on data saved on the computer system from a previous visual inspection.

\* \* \* \* \*